United States Patent
Abadi et al.

(10) Patent No.: US 9,769,590 B2
(45) Date of Patent: Sep. 19, 2017

(54) MOVING CRITICAL ACTIONS WITHIN A MOBILE APPLICATION

(71) Applicant: International Business Machines Corporation, Armonk, NY (US)

(72) Inventors: Aharon Abadi, Petach Tikva (IL); Moria Abadi, Petach Tikva (IL); Jonathan Bnayahu, Haifa (IL); Idan Ben-Harrush, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/572,803

(22) Filed: Dec. 17, 2014

(65) Prior Publication Data

US 2016/0182654 A1    Jun. 23, 2016

(51) Int. Cl.
*G06F 15/16*    (2006.01)
*H04W 4/00*    (2009.01)

(52) U.S. Cl.
CPC .................. *H04W 4/003* (2013.01)

(58) Field of Classification Search
CPC .......... H04L 67/18; H04L 67/10; H04L 67/42
USPC ........................................................ 709/217
See application file for complete search history.

(56) References Cited

U.S. PATENT DOCUMENTS

| | | | | |
|---|---|---|---|---|
| 7,860,964 B2 * | 12/2010 | Brady | ................. | H04L 61/1511 709/219 |
| 8,832,184 B1 * | 9/2014 | Britto | ..................... | G06F 9/542 709/203 |
| 2004/0198395 A1 * | 10/2004 | Kimoto | ................. | G01C 21/26 455/456.1 |
| 2006/0031524 A1 * | 2/2006 | Freimuth | ................ | H04L 49/90 709/227 |
| 2006/0277271 A1 * | 12/2006 | Morse | ..................... | H04L 67/26 709/217 |
| 2008/0228772 A1 * | 9/2008 | Plamondon | ....... | G06F 17/30902 |
| 2014/0095943 A1 * | 4/2014 | Kohlenberg | ............ | H04L 29/08 714/47.3 |
| 2014/0304352 A1 * | 10/2014 | Chaudhary | ........... | G06F 9/5011 709/208 |

FOREIGN PATENT DOCUMENTS

EP    2221719    8/2010

OTHER PUBLICATIONS

IBM, "Handling Application Execution Automatically from Requirements Specification", IP.com, IPCOM000179128D, Feb. 6, 2009.

* cited by examiner

*Primary Examiner* — Sm Rahman
(74) *Attorney, Agent, or Firm* — Ziv Glazberg

(57) ABSTRACT

A computer-implemented method, a computerized apparatus and a computer program product, the method comprising: receiving a program to be executed on a mobile device; building a data structure representing states within the program and transitions between the states; and based on the data structure, determining by a processor a location of at least one command related to using data retrieved from a server, such that at least one fetching command is to be provided for the data to be available when execution reaches the location.

16 Claims, 3 Drawing Sheets

MOVING CRITICAL ACTIONS WITHIN A MOBILE APPLICATION

TECHNICAL FIELD

The present disclosure relates to software applications in general, and to enhancing performance of software applications in particular.

BACKGROUND

In recent decades, electronic technology, and in particular mobile devices, has revolutionized our everyday lives. Devices such as cell phones having cellular and Wi-Fi access to the Internet have permeated the lives of almost every person living in the developed world, and a significant number of people living in undeveloped countries. Mobile communication and computing devices, especially, have become the means by which countless millions conduct their personal and professional interactions with the world. It has become almost impossible for many people, especially those in the business world, who use these devices as a means to improve productivity, to function without access to their electronic devices.

Tightly related to this device proliferation, an increasing number of applications are developed for such devices, including versions of enterprise applications adapted to mobile devices, such as banking applications, Enterprise resource planning (ERP) applications, Customer relationship management (CRM) applications, and others.

Some of these applications are highly dependent on server access, since many user operations require retrieving or storing data to or from a server. Thus, the connectivity and the usage patterns of the applications highly affect the user experience and usability of the applications, and present the developer with particular challenges when designing and implementing such applications.

The term network connectivity may relate to a multiplicity of factors, e.g. whether the device is connected to the network, the network signal strength, the network signal trend based on location and time, which type of connection is available e.g. secure or insecure network, or other characteristics of the environment.

Other factors that may also affect the usage may include the user's whereabouts, the user's typical navigation paths and common actions within the application, favorite hot spots within the application, or the like.

Thus, the dynamic environment, usage context or specific user style of interaction, may all affect the usability of an application.

BRIEF SUMMARY

One exemplary embodiment of the disclosed subject matter is a computer-implemented method comprising: receiving a program to be executed on a mobile device; building a data structure representing states within the program and transitions between the states; and based on the data structure, determining by a processor a location of at least one command related to using data retrieved from a server, such that at least one fetching command is to be provided for the data to be available when execution reaches the location.

Another exemplary embodiment of the disclosed subject matter is a computerized apparatus having a processor, the processor being adapted to perform the steps of: receiving a program to be executed on a mobile device; building a data structure representing states within the program and transitions between the states; and based on the data structure, determining a location of at least one command related to using data retrieved from a server, such that at least one fetching command is to be provided for the data to be available when execution reaches the location.

Yet another exemplary embodiment of the disclosed subject matter is a computer program product comprising a computer readable storage medium retaining program instructions, which program instructions when read by a processor, cause the processor to perform a method comprising: receiving a program to be executed on a mobile device; building a data structure representing states within the program and transitions between the states; and based on the data structure, determining by a processor a location of at least one command related to using data retrieved from a server, such that at least one fetching command is to be provided for the data to be available when execution reaches the location.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is the need to enhance the performance of applications executed by mobile devices and in particular applications requiring access to servers for retrieving or storing data, such as enterprise applications. The performance may be affected by factors such as the available network connectivity, the user's navigation patterns within the application, the user's schedule and whereabouts, or others.

One technical solution is to dynamically modify the data flow, data access, data pre-fetch or other data accesses within the mobile application, in accordance with the available or projected, e.g., predicted, network conditions, or in accordance with the user's typical behavior and application paths, in order to improve performance, resource consumption, and user experience. The server accessing commands may have been decided by the developer during development of the application. However, since the accesses as designed are uniform for all users at all times and all connectivity conditions, there is high likelihood that they are suboptimal for at least some of the users at some of the times. Modifying and personalizing the mobile application, whether dynamically or statically, may provide for enhanced usage. For example, if it is known or assumed that the user is about to move to a location with no network connectivity, the data usually required by the user may be fetched before the user leaves.

The available network conditions may be determined at runtime, while the projected network behavior may be estimated based on factors such as the user's calendar or the user's past behavior and habits. The required actions may be determined by tracing the user's activities and navigation paths within the application.

In some embodiments, the required modifications may be determined as follows: the application may be depicted as a data structure, such as a directed graph, in which each node represents a page or a state of the application, and an edge from a first node to a second node represents possible transition from the first page to the second page.

Figure 1:
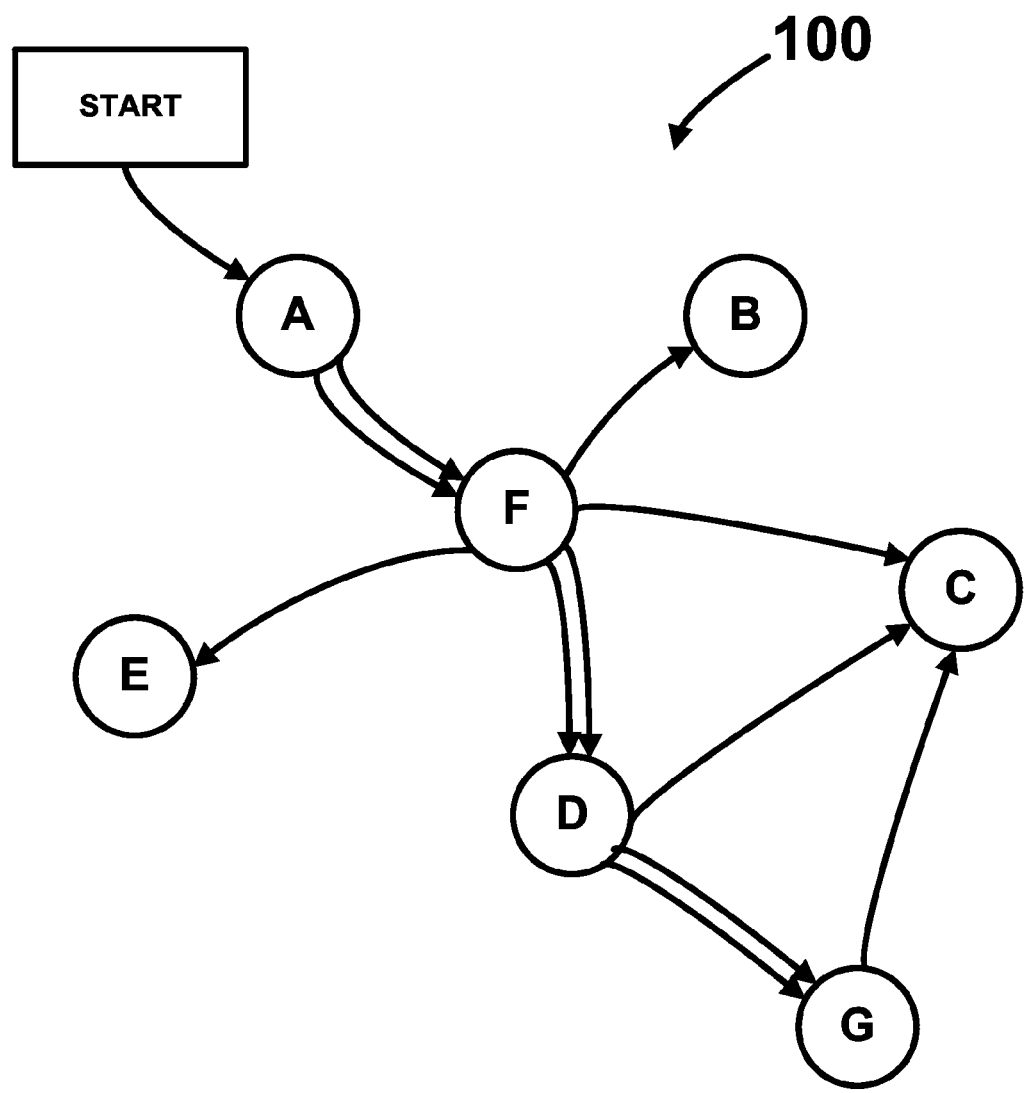
FIG. 1 shows a schematic illustration of the input and output of a method and apparatus for assessing the findability of a query in respect to a corpus, in accordance with some exemplary embodiments of the subject matter.

Referring now to FIG. 1, showing an application for which data accesses may be improved, wherein the application is represented as a graph. The application comprises seven pages, marked A through G. An edge from a source node to a destination node indicates a possible transition from the page represented by the source node to the page represented by the destination node.

It will be appreciated that typically most edges are bi-directional, since in most cases the "back" button will provide transition from the current page to the preceding page. The back edges were omitted from FIG. 1 in order to enhance clarity.

Each edge within the graph may be associated with data fetched at the first page and used on the second page (or at least transferred to the second page to be used at a later time or on a page reachable from the second page).

The user's navigation habits may be traced for a while, for example by keeping and parsing a log file, tracing events, or the like. Transitions in the log file or another log of the user's activities may then be translated into one or more paths within the graph. For example, the doubled edges in the graph of FIG. 1 may represent transitions that a user takes often, for example at least once every predetermined period of time in which the user is using the application, at least a first predetermined number in every second predetermined number of activations of the application, or the like. Once the user's habits in navigating the application are known, data storing or retrieving commands may be moved accordingly. For example, since in the example of FIG. 1 the user does not navigate often from page F to page C, the fetching of data currently fetched on page F and required on page C may be moved to occur on page C if and when the user navigates to page C, and not on page F, thus on average increasing performance by saving time and bandwidth and. However, other considerations may be taken into account. For example, in some cases each access to the database may require a fixed amount of resources for a large range of data volumes. In such cases, if only a small amount of data is required on page C, it may be beneficial to fetch this data whenever fetching the data for page D, since no extra charge is applied, such that even if the data is seldom required it may still prove helpful in some cases.

The system may further learn about factors such as network connectivity by following the connectivity status of the user for a while, or by a rule entered by the user, by an administrator, or the like. For example, suppose that a user usually leaves the office at 6 PM, and goes by subway back home. Thus, if it is close to 6 PM and the user's calendar for the day does not contain further meetings, in may be concluded that the user may not have network connectivity for a while. Additional examples can relate to prediction of expected mobile airplane mode due to identification of the user current location at the airport, and verification against the user's calendar appointments. Another example may relate to the network type. For example, if the user is at work it may be assumed that the user is connected via a secure network. If the user's calendar or location service implies that the user is going to leave the office, it may be assumed that the user will later be connected via insecure network, meaning that the user will not have access to secure data. Further factors may relate to identifying idle time, busy I/O sessions or other behaviors of the application or the user that may affect performance.

In such examples, if it is known that the user is about to lose connectivity while the user is on page F, data entered by the user may be stored and data required for both pages D and C may be fetched to be available in case the user navigates to either page, although in other circumstances only the data required for page D may be fetched as described above. In further embodiments, data related to all pages may be pre-fetched such that the user may continue operating the application.

Thus, the disclosure relates to dynamically changing the timing or location within the code of data accessing commands in accordance with dynamic connectivity conditions and usage habits or requirements.

In some embodiments, the data accesses may not be changed for a specific user, rather the data may be collected upon the usage of one or more users. Recommendations as to how to improve data access, for example by adding access commands at locations such that the information is available when required, may then be determined and provided to a developer of the application, such that the application may be enhanced for all users. For example, if a transition is seldom taken, all data fetched at the source of the transition and used at the destination of the transition may be fetched only at the destination of the transition.

In some embodiments, the user may even avoid inserting at least some of the commands that fetch the data, but rather provide assertions what data is needed and where, such that the system may automatically add the fetching commands. For example, if data is needed on pages C, D and E wherein the user almost always navigates to any of them,. The data fetching commands may be added at the code associated with page F.

One technical effect of utilizing the disclosed subject matter is the dynamic enhancement and improvement of mobile applications, in accordance with the available conditions and the user's habits and requirements. In some embodiments of the disclosure fetching unnecessary data may be avoided altogether or delayed until the data is actually required. In some embodiments, data may be pre-fetched if it is determined that the data may be needed when the user will not have network connectivity, will have insecure connectivity, or the like.

Another technical effect of the disclosed subject matter is the establishment of recommendations to an application developer related to how to improve the performance of an application by changing when data store and data retrieval commands are called, based on evaluating users' behavior with the application.

Figure 2:
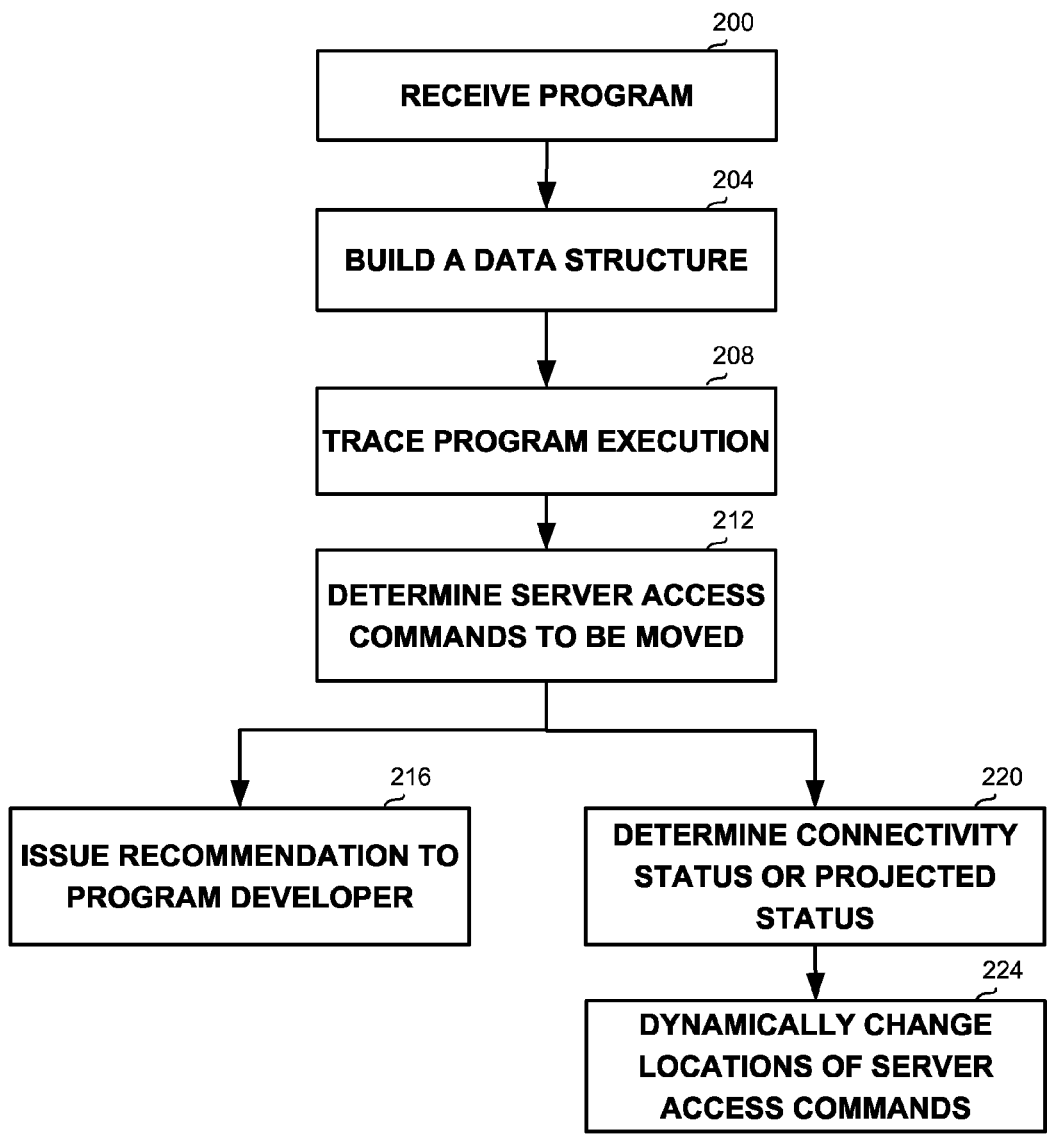
FIG. 2 shows a flowchart diagram of a method for enhancing application performance, in accordance with some exemplary embodiments of the disclosed subject matter.

Referring now to FIG. 2, showing a flowchart diagram of a method for enhancing application performance by dynamically changing the location of server-access related commands, in accordance with the available or projected conditions and user's navigation within the application.

On step 200, a program to be enhanced may be received. The program may be received as a web application, an executable, a library, or any other executable unit. Alternatively, the program may be received in source code.

On step 204, a data structure such as a graph may be built upon the program. If the data structure is a graph, each node in the graph may represent a particular state, such as a particular page in a mobile application, and each edge may represent a possible transition from a first page to a second page.

The data structure may be built statically by analyzing the code, for example locating the defined pages and creating a node in a graph for each page, and creating an edge for possible transition between two pages.

Alternatively, the data structure may be built dynamically by tracing the executed program and creating a node for each page the first time it is displayed, and an edge upon the transition between two pages.

Combination

Each transition between states or pages may be associated with data that is retrieved on a first state in which it is not used and transferred from the source state to the destination state, whether it is used in the second state or transferred further.

It will be appreciated that the graph data structure is exemplary only and other data structures representing states and transitions therebetween may be used.

On step 208, the program execution for a particular user may be traced for determining actual navigation paths within the graph, wherein a navigation path may relate to two or more states and corresponding transitions. The paths may be created by indicating transitions that take place between pages when the user navigates within the program.

It will be appreciated that if the graph is built dynamically on step 204 based on actual executions, then this build may also include step 208. In such case, the graph may comprise only the states visited by the user and edges traversed by the user moving between pages, and not all possible pages and transitions.

On step 212 the program may be analyzed to determine commands related to accessing the server that should be moved to other locations. Such commands may include commands executed when the program is executing a particular page but data fetched by the command is not used on that page but rather provided to another page. In this case the commands may be moved to the page on which the data is used. Further commands to be moved may relate to the opposite cases, in which a user is in a first page from which the user normally navigates to a second page. If significant amount of data, which takes a long time to fetch, is required on the second page, or if the user may not have network connectivity when he or she arrives at the second page, the data fetch may be initiated on the first page, such that the data will be available without delay when the user gets to the second page, whether the user has network connectivity or not.

It will be appreciated that the analysis may be performed statically, e.g. based on the graph, dynamically e.g. based on traces, or any combination thereof.

Optionally, some commands to be moved may be determined in a conditional manner. For example, it may be recommended that a data fetch command be maintained at its current location if continuous connectivity is assumed, and moved to an earlier stage otherwise.

In some embodiments, the user may not call the data-accessing commands but only insert assertions where data is needed. In these cases, the data-accessing commands may be added automatically at the efficient locations, which may also depend on the user or the circumstances.

On step 216, recommendations related to the determined commands to be moved may be provided to a program developer or maintainer. The developer may examine the recommendations and may determine whether to adopt any of them, change the code accordingly and provide to users the updated program.

Step 220 may be performed in runtime, when the user is using the program. On step 220 the current or projected connectivity status of the user may be determined. The current connectivity status may be determined by readings or messages or another Application Program Interface (API) from communication components of the device on which the program is executed. The projected connectivity status may be determined upon predefined rules such as "every day between 6 PM and 7 PM the user may have no connectivity". Additionally or alternatively, the projected status may be determined upon past experience or patterns thereof, for example receiving traces showing that the user frequently has no connectivity between 6 PM and 7 PM and the user has no further meetings after 6 PM. Additionally or alternatively, the projected status may be determined based upon a particular location of the user such as an airplane or particular meetings such as a meeting description which includes the word "flight".

On step 224, commands or the locations thereof may be dynamically and automatically changed, so that data access is moved from one location to another, based upon the commands determined on step 212 and possibly considering the current or projected connectivity status, in particular if the recommendation whether to move the command is conditional. It will be appreciated that the code may be changed ad-hoc for a particular execution of a particular command, temporarily for a particular command for the whole execution, for predetermined number of executions, conditionally, permanently, or under any other restrictions.

Commands may be moved by dynamically changing a called method, function, procedure or another executable unit. For example, a data fetch command may be replaced with a conditional data fetch command which occurs only under certain conditions, such as projected lack of connectivity. Data usage may be replaced by calling a method or function in which data availability is assessed, and fetching it if not. The commands may be changed in a binary file, or in a source code interpreted file.

Figure 3:
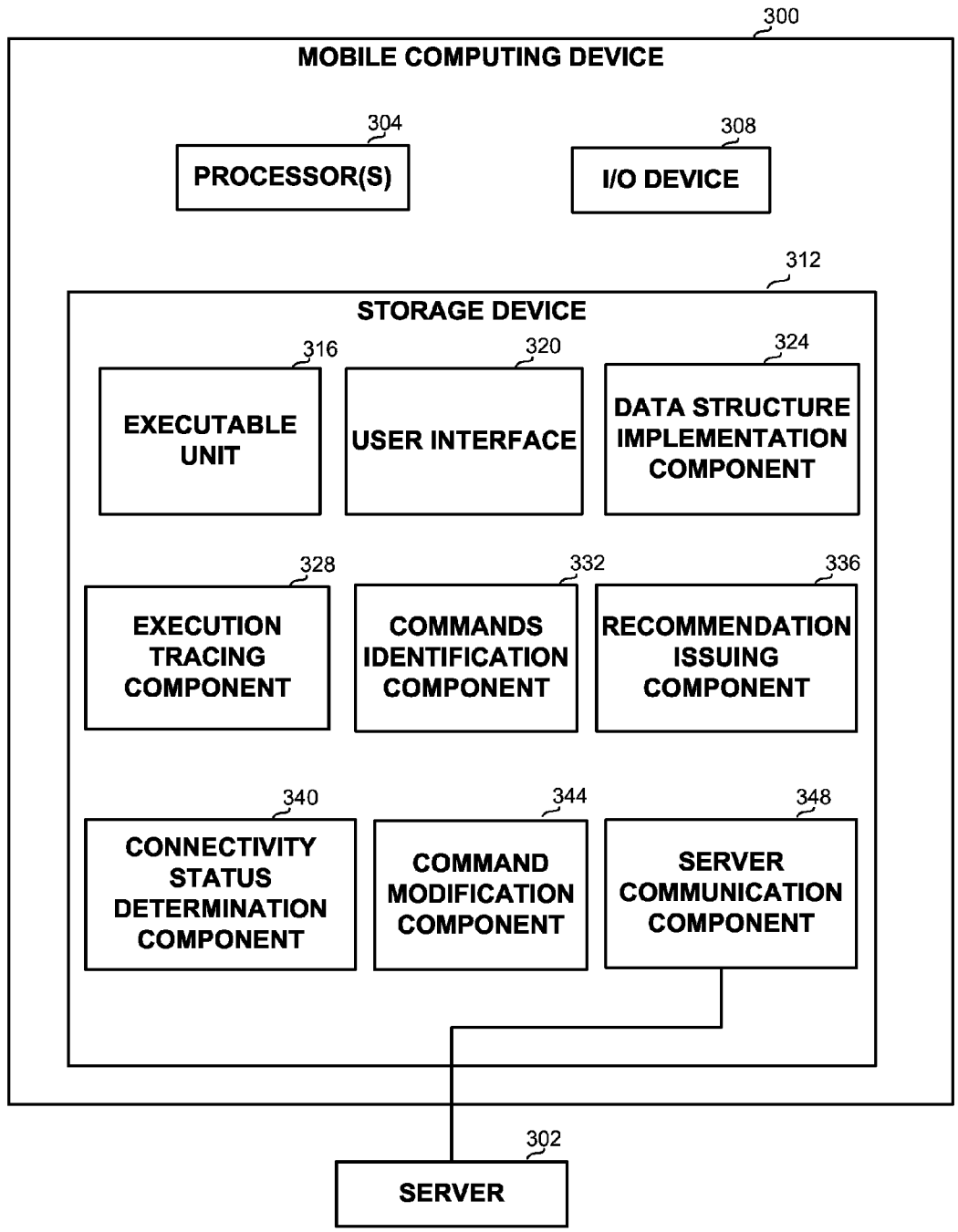
FIG. 3 shows a block diagram of an apparatus for enhancing application performance, in accordance with some exemplary embodiments of the disclosed subject matter.

Referring now to FIG. 3 showing an apparatus 300 configured to enhance the performance of a mobile application.

In some exemplary embodiments, apparatus 300 may be implemented in a mobile computing device such as a smartphone, a laptop, a tablet computer or the like, capable of executing applications that retrieve data from one or more server(s) 302 or store data on server 302, for example enterprise applications.

Apparatus 300 may comprise one or more processor(s) 304. Processor 304 may be a Central Processing Unit (CPU), a microprocessor, an electronic circuit, an Integrated Circuit (IC) or the like. Processor 304 may be utilized to perform computations required by the apparatus 300 or any of it subcomponents.

In some exemplary embodiments of the disclosed subject matter, apparatus 300 may comprise an Input/Output (I/O) device 308 such as a display, a pointing device, a keyboard, a touch screen, or the like. I/O device 308 may be utilized to provide output to and receive input from a user.

In some exemplary embodiments, apparatus 300 may comprise a storage device 312. Storage device 312 may be a hard disk drive, a Flash disk, a Random Access Memory (RAM), a memory chip, or the like. In some exemplary embodiments, storage device 312 may retain program code operative to cause the processor 304 to perform acts associated with any of the subcomponents of apparatus 300. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may comprise executable unit 316 which it is required to enhance. Executable unit 312 may be a loaded part of a web application, a stand-alone application, or any other unit comprising computer instructions, some of which accessing a server for storing or retrieving data.

Storage device 312 may comprise user interface module 320 for a user to enter information such as one or more rules, receive recommendations, or the like.

Storage device 312 may also comprise data structure implementation component 324 for receiving executable unit 316 or source code and build a data structure such as a graph representing the available pages and transitions therebetween. Data structure implementation component 324 may be further operative to receive dynamic information about a user moving between pages and indicate such actual transitions as part of the data structure. Data structure implementation component 324 may also be operative to associate one or more edges with data retrieved on a first page and used on a second page reachable from the first page.

Storage device 312 may comprise execution tracing unit 328 for determining navigation paths of a user between pages, which may be indicated or used by data structure implementation component 324.

Storage device 312 may further comprise commands identification component 332 for identifying commands that may be moved from a location associated with one page to another location associated with another page. Such movement may be performed or suggested, for example, since data is retrieved by the command on the first page but is used only on a second page or further pages.

Storage device 312 may also comprise recommendation issuing component 336 for issuing recommendation to a developer or another person having access to the source code, to change the location within the code of one or more data-accessing commands such as the commands identified on commands identification component 332.

Storage device 312 may further comprise connectivity status determination component 340 for determining current or projected connectivity status based on readings from communication components, predefined rules, traced connectivity statuses over a period of time, habits, deduction from calendar items or lack thereof, or the like.

Storage device 312 may also comprise command modification component 344 for dynamically modifying commands in binary code, and in particular modifying commands related to accessing a server, as detailed above. Storage device 312 may also comprise server communication component 348 for communicating with server 302, for purposes including retrieving data from the server, storing data to the server, or the like.

Storage device 312 may also comprise a data and control flow management component for managing the flow of information and control between other components.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising: obtaining a data structure representing a program to be executed on a mobile device; based on the data structure, determining by a processor, a location of at least one command related to using data retrieved from a server, wherein at least one fetching command is to be executed in order to retrieve the data from the server, whereby the at least one fetching command is to be executed prior to reaching the location in order for the data to be available when execution reaches the location; determining a modified fetching location for the at least one fetching command, wherein a code of the program indicates execution of the at least one fetching command at an original location, wherein said determining the modified fetching location comprises postponing executing the at least one fetching command with respect to the original location, wherein the modified fetching location is reached prior to reaching the location of the at least one command; and determining a connectivity status of the mobile device executing the program, wherein the connectivity status is a projected connectivity status, wherein said determining the modified fetching location comprises dynamically determining the modified fetching location based on the connectivity status.

2. The method of claim 1, further comprising tracing the program to determine a navigation path of a user within the program, wherein the navigation path relates to two or more states within the program and corresponding transitions between the two or more states.

3. The method of claim 1, further comprising issuing recommendation for changing source code of the program, based on the at least one command.

4. The method of claim 1 wherein an execution location of the at least one fetching command is changed once, for a particular execution, or is changed permanently.

5. The method of claim 1, wherein the projected connectivity status is determined in accordance with one or more items selected from a group consisting of: a predetermined rule; connectivity status traces collected over a period of time; patterns detected in connectivity status traces; and items in a calendar of a user of the device or lack thereof.

6. The method of claim 1, wherein said obtaining comprising:

obtaining the program to be executed on the mobile device; and building the data structure, wherein the data structure representing states within the program and transitions between the states, wherein said building is performed dynamically, based on an execution of the program, wherein said data structure comprises only states visited by a user of the mobile device and transitions traversed by the user during the execution.

7. The method of claim 1, further comprising: executing the at least one fetching command at the modified fetching location instead of at the original location.

8. The method of claim 1, wherein said determining the modified fetching location is performed dynamically during the execution of the program.

9. The method of claim 1, wherein the connectivity status is a current connectivity status, wherein a current connectivity status indicates either having or not having a connection to the server.

10. A computerized apparatus having a processor, the processor being adapted to perform the steps of: obtaining a data structure representing a program to be executed on a mobile device, wherein the data structure represents states within the program and transitions between the states; based on the data structure, determining a location of at least one command related to using data retrieved from a server, wherein at least one fetching command is to be executed in order to retrieve the data from the server, whereby the at least one fetching command is to be executed prior to reaching the location in order for the data to be available when execution reaches the location; determining a modified fetching location for the at least one fetching command, wherein a code of the program indicates execution of the at least one fetching command at an original location, wherein said determining the modified fetching location comprises postponing executing the at least one fetching command with respect to the original location, wherein the modified fetching location is reached prior to reaching the location of the at least one command; and determining a connectivity status of the mobile device executing the program, wherein the connectivity status is a projected connectivity status, wherein said determined the modified fetching location comprises dynamically determining the modified fetching location based on the connectivity status.

11. The computerized apparatus of claim 10, wherein the processor is further adapted to trace the program to determine a navigation path of a user within the program, wherein the navigation path relates to two or more states within the program and corresponding transitions between the two or more states.

12. The computerized apparatus of claim 10, wherein the processor is further adapted to perform the step of issuing recommendation for changing source code of the program, based on the at least one command.

13. The computerized apparatus of claim 10, wherein the connectivity status is a current connectivity status, wherein the current connectivity status indicates either having or not having a connection to the server.

14. The computerized apparatus of claim 10, wherein the projected connectivity status is determined in accordance with one or mare items selected from a group consisting of: a predetermined rule; connectivity status traces collected over a period of time; patterns detected in connectivity status traces; and items in a calendar of a user of the device or lack thereof.

15. The computerized apparatus of claim 10, wherein said determining the modified fetching location is performed dynamically during the execution of the program.

16. A computer program product comprising a non-transitory computer readable storage medium retaining program instructions, which program instructions when read by a processor, cause the processor to perform a method comprising: obtaining a data structure representing a program to be executed on a mobile device, wherein the data structure represents states within the program and transitions between the states; based on the data structure, determining by a processor a location of at least one command related to using data retrieved from a server, wherein at least one fetching command is to be executed in order to retrieve the data from the server, whereby the at least one fetching command is to be executed prior to reaching the location in order for the data to be available when execution reaches the location; determining a modified fetching location for the at least one fetching command, wherein a code of the program indicates execution of the at least one fetching command at an original location, wherein said determining the modified fetching location comprises postponing executing the at least one fetching command with respect to the original location, wherein the modified fetching location is reached prior to reaching the location of the at least one command; and determining a connectivity status of the mobile device executing the program, wherein the connectivity status is a projected connectivity status, wherein said determining the modified fetching location comprises dynamically determining the modified fetching location based on the connectivity status.

* * * * *